(12) United States Patent
Li

(10) Patent No.: US 7,003,695 B2
(45) Date of Patent: Feb. 21, 2006

(54) UNDO/REDO ALGORITHM FOR A COMPUTER PROGRAM

(75) Inventor: Chia-Hsin Li, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 555 days.

(21) Appl. No.: 10/264,790

(22) Filed: Oct. 3, 2002

(65) Prior Publication Data

US 2004/0068678 A1     Apr. 8, 2004

(51) Int. Cl.
*G06F 11/00*     (2006.01)
(52) U.S. Cl. ..................... 714/19; 715/530
(58) Field of Classification Search ............ 714/19, 714/20; 715/530
See application file for complete search history.

(56) References Cited

U.S. PATENT DOCUMENTS

| | | | |
|---|---|---|---|
| 5,455,944 A | | 10/1995 | Haderle et al. |
| 5,479,601 A | | 12/1995 | Matheny et al. |
| 5,481,710 A | | 1/1996 | Keane et al. |
| 5,519,862 A | * | 5/1996 | Schaeffer et al. ........... 717/165 |
| 5,524,205 A | | 6/1996 | Lomet et al. |
| 5,530,864 A | * | 6/1996 | Matheny et al. ............. 719/315 |
| 5,537,526 A | * | 7/1996 | Anderson et al. ........... 715/515 |
| 5,583,982 A | * | 12/1996 | Matheny et al. ............. 715/762 |
| 5,990,906 A | * | 11/1999 | Hudson et al. .............. 345/666 |
| 6,185,591 B1 | * | 2/2001 | Baker et al. ................. 715/531 |
| 6,259,446 B1 | * | 7/2001 | Matheny et al. ............. 715/764 |
| 6,757,905 B1 | * | 6/2004 | Friedman et al. ........... 719/320 |
| 2004/0054640 A1 | * | 3/2004 | Reichel et al. .................. 707/1 |
| 2004/0268187 A1 | * | 12/2004 | Burke et al. ................... 714/40 |
| 2005/0102630 A1 | * | 5/2005 | Chen et al. .................. 715/770 |

* cited by examiner

*Primary Examiner*—Bryce P. Bonzo
(74) *Attorney, Agent, or Firm*—Rosalio Haro

(57) ABSTRACT

A method of tracking modifications of specific program objects during the runtime of a computer program, facilitates the creation of general UnDo and ReDo operations, as well as the support of an object-specific UnDo operation. When an object is modified, the object is interrogated to collect information about it and how the modification may be undone. The collected information is stored in a highly unbalanced data-tree structure. Since the interrogation of an object is a characteristic of the programming language, and not necessarily a modification of the program being executed, the present method may be easily applied to different existing programs with minimal, if any, modification to the existing programs.

20 Claims, 8 Drawing Sheets

UNDO/REDO ALGORITHM FOR A COMPUTER PROGRAM

BACKGROUND OF THE INVENTION

1. Field of the Invention

The present invention relates generally to the tracking of program operations on a computer system, and more particularly to a method of incorporating an undo operation into application programs with minimal changes to the application programs.

2. Description of the Related Art

Many of today's computer program incorporate "undo" functionality whereby the most recently committed modification to a program object may be undone, and the program object restored its state immediately prior to the modification. Some applications support multi-level undo, whereby multiple modifications starting from the most recent to the earliest may be undone in sequence.

U.S. Pat. No. 5,481,710 to Keane et al., explains that due to the many different types of programs and different data types each program supports, it is very difficult to provide one undo algorithm, or method, that can be easily incorporated into different types of programs. Therefore, the undo function is typically tightly integrated, and customize, to each program. To address this issue, Keane et al. describe an undo/redo service that is established in the computer system where a program that will use their undo/redo service is installed. Application programs that want to make use of the undo/redo service must register themselves with the undo/redo service. The service will then maintain a log of modifications, however, the service itself does not monitor for modifications or even determine what changes have been done. Keane et al. still require that each program determine for itself what operations should be logged with the service. Furthermore, each program must build a service packet that contains the identity of the modified object and an instruction set that, when applied to the object, would cause the action to be undone, and instructions that, when applied to the object or objects, would cause the action to be redone. Thus in Keane et al., each program still has to be modified to have a customized undo/redo sub-program to generate a custom undo/redo sequence. In fact, Keane et al.'s service seems to just provide a logging and storing service for undo/redo service packets.

What's more, Keane et al.'s service can only undo the most recent operation, and does not appear flexible enough to provide targeted undo functions to object out of sequence order.

What is needed is a method, process, or service that can be made to provide an undo operation to existing programs with minimal modification to existing programs. That is, each existing program should have to be modified to itself generate an undo instruction sequence, or packet, that is to be stored in stack, and later popped for execution, as is the case in Keane et al.

OBJECTS OF THE INVENTION

Therefore, it is an object of the present invention to provide a method of tracking modifications to program objects, wherein the method requires minimal modification to the program itself.

It is another object of the present invention to provide a process for implementing an undo method wherein the process itself determines what parameters of an object were modified and what functions are required to restore the modified program object to its prior state, such that the main program need not be modified to support this function.

It is yet another object of the present invention to provide a data storage, tree structure better suited for storing object modifications, and for facilitating the implementation of both an undo of the most recent modification and an undo of a specifically targeted object's most recent modification.

SUMMARY OF THE INVENTION

The present invention uses an "unbalanced tree" structure to keep track of undoable events in an application. Each node in the tree may consist of an object name, such as "text", followed by a string identifying an edited property, such as "color", and the property's assigned value, such as "red", prior to the edit operation. As a user makes an undoable operation, the tree grows a leftward branch inserting a new node for the operation. If an object within a node contains additional nested objects within it, then a rightward branch is created for each edited nested object. Thus, a node may have multiple right-ward branches extending from it, but the right-ward branches will be relatively short since they identify only nested objected within a larger object.

An undo operation may begin at any node within the tree structure. As a node within the tree structure is targeted for an undo operation, it become a "parent node" and all of its left-ward and right-ward "children nodes" are automatically undone as well. Thus, the user may jump back several steps without having to manually undo each intervening step.

In a more specific implementation, when an object is modified during execution of a program within a computing device, the modified object is interrogated to collect information about it and how the modification may be undone. The collected information is stored in the highly unbalanced tree. When an undo request for a target object is received, the information is retrieved. From the retrieved information, the present invention can discern what functions are supported by the target object and generates an instruction sequence including restorative parameters sufficient for undoing the most recent modification of the target object.

The operation of interrogating an object is characteristic of the programming language, and not necessarily a functionality that needs to be added to the program being monitored for modifying operations. Also, since the determination of the undo instruction sequence is determined by the present invention, an existing program does not been to be modified to generate for itself an undo sequence, and to itself submit the undo sequence for storage. Thus, the present undo mechanism can be easily integrated into a multitude of computer programs with minimal modification to the program itself.

In a preferred embodiment, the present undo system utilizes the Java Reflection API, which can invoke a function in a Java class by passing a string of the name of the function and the types of the parameters of the function one is calling. When an object in a document is changed, the present invention records the information of how to restore the value of the changed object. When the present undo function is called, the presently preferred embodiment will find the latest restored information in its records and restore the value of the modified objects.

BRIEF DESCRIPTION OF THE DRAWINGS

In the drawings wherein like reference symbols refer to like parts.

DESCRIPTION OF THE PREFERRED EMBODIMENTS

The present invention provides for easy integration of an "undo" functionality into multiple different computer programs with minimal modification to the computing programs themselves. This is brought about by its method of tracking modifications to program objects within a run-time environment, as is more fully explained below. Furthermore, since a main functionality of the present invention is to maintain a log of modifications to program objects, the present invention may also be used in for implementing a "redo" function, as is also more fully explained below.

As is it known in the art, execution of an "undo" function typically causes the most recently executed change in a running computer program to be nullified, i.e. to be undone so as to restore the running computer program to a state prior to the most recent modification. Similarly, a "redo" operation causes the most recent undo operation to be redone. To accomplish this, the present invention maintains a log of modifications to program objects.

Figure 1:
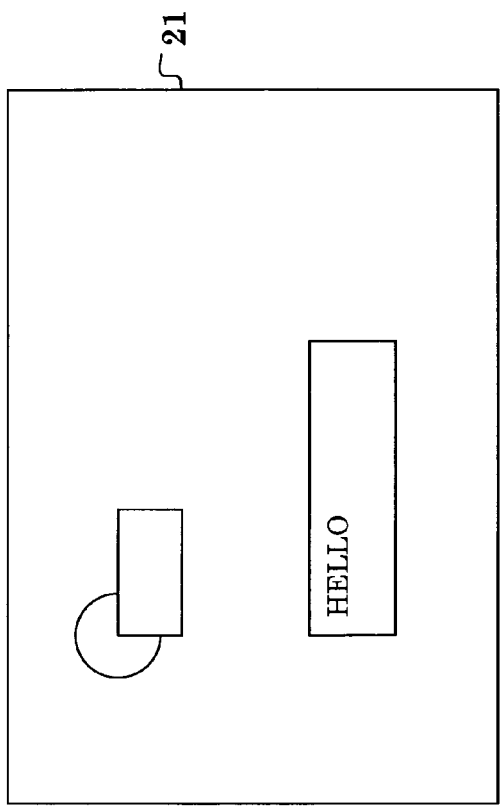
FIG. 1 is an example of program objects on a computer screen in accord with the present invention.

With reference to FIG. 1, a program object may be an instantiated item displayed on a screen 21 of a computing device, not shown, during the execution of a computer program. Examples of such instantiated items are circle 11, square 13, and text box 15. As it is further known in the art, and is especially integral to object-oriented programming, a program object is not necessarily a displayable item on a screen, but may refer to a collection of data structures and functions, or methods, bundled within a defined object-type, or class, category. However, the present invention is primarily concerned with objects capable of being displayed on a screen 21 since these are the type of program objects to which an undo function is most often applied.

Each object is typically defined by a collection of parameter values and a list of integrally supported functions. Such parameters may include, for example, coordinates indicating where on the screen the program object should be displayed, or the z-order in which overlaying objects should be displayed. For example in FIG. 1, square 13 is shown overlaying circle 11, meaning that circle 11 would typically be drawn first, followed by square 13. Additional parameters may refer to the display characteristics of an object, such as requiring square 13 to be opaque so that the portion of circle 11 overlapped by square 13 cannot be seen. Alternatively, a square 13 may have modifiable attributes making it transparent, or altering the thickness/color of its outline.

To minimize the size of a modification log, which tracks program object modifications, in a preferred embodiment of the present invention only the changed parameters of a modified program object are preferably added to the log. In this approach, it is assumed that when a user modifies a program object, there are only two possible modifications that may be made: one or more attributes of the program object are modified or the z-order (which defines the order in which objects are overlaid) is modified. Thus in this approach, the amount of logged modifications are reduced to attribute and z-order parameters.

Figure 2:
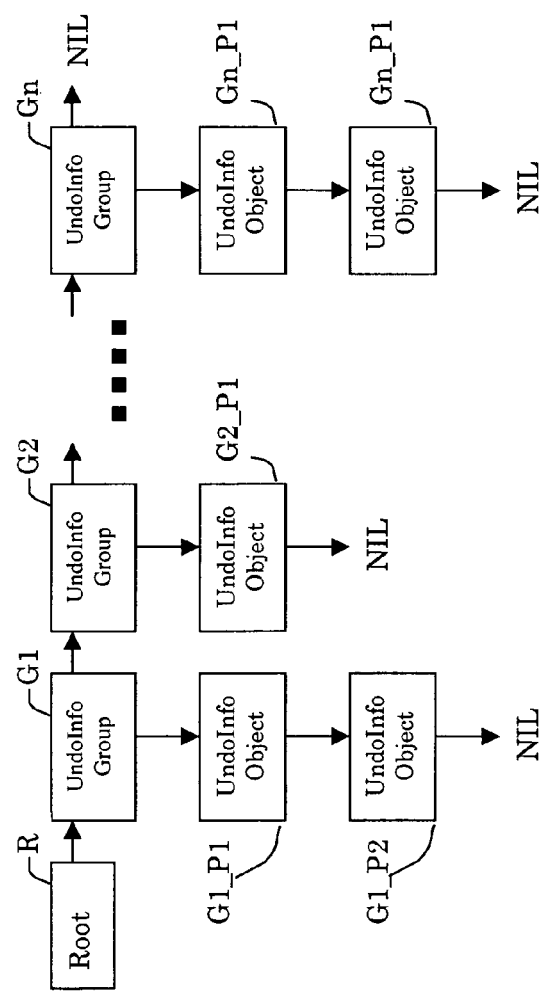
FIG. 2 is an unbalance tree structure for storing modifications to program objects, in accord with a first embodiment of the present invention.

With reference to FIG. 2, a preferred structure for a modification log in accord with the present invention consists of a series of serially coupled UndoInfo Groups G1–Gn delimited by a start-of-series indicator "Root" at its origin an end-of-series indicator "Nil" at its end. Each UndoInfo Group is correlated to a unique program object. As it would be understood, this correlation may be based on each object's unique identifier. In this manner, multiple circle objects of the same object type, or class, may be distinguished by their respective object identifiers such as the object name, i.e. Circle_1, Circle_2, etc. As each object in a running computer program is modified, a new UndoInfo Group is appended to the series of UndoInfo Groups G1–Gn.

Extending from each UndoInfo group is a corresponding series of characterizing data, or ID parameter values, that at least specify the modified parameters of the object identified by the UndoInfo group. In FIG. 2, each logged ID parameter is labeled "UndoInfo Object", since it provides the information for undoing a modification to an object.

As shown, multiple changes to an object may be recorded at a time. For example, UndoInfo Objects G1_P1 and G1_P2 group together two modifications made to the object correlated to UndoInfo Group G1. For the sake of brevity, the name of an UndoInfo Group and the program object to which it is correlated will be used interchangeably with the understanding that each UndoInfo Group maintains information, including at least a unique identifier for its correlated program object. Thus, UndoInfo Object G2_P1 indicates one change to UndoInfo Group G2, and UndoInfo Objects Gn_P1 and Gn_P2 indicate two changes to UndoInfo Group Gn.

Alternatively, each data group of characterizing data, such as UndoInfo Objects G1_P1 and G1_P2, corresponding to an UndoInfo Group, such as G1, may each provide information that collectively indicates how a current modification may be undone. That is, a group of UndoInfo Objects may collectively show how to undo one change to the correlated program object. For example, if a modification changed the size of a Circle Object, a first UndoInfo Object, such as G1_P1, may store the name of a function needed to restore the size of the Circle Object, and a second UndoInfo Object, such as G1_P2, may store a Radius Size Parameter for restoring the size of the Circle Object.

In either case, each collection of UndoInfo Group and corresponding UndoInfo Objects preferably store: the target object on which to apply the undo operation; an Integer, ID, indicating the type of the information that identifies the types of changes to be made (i.e. an attribute change or a z-order change); a string indicating the function name of a function used to restore the attribute of the target object; and an "Object" specifying the recorded value of the old attribute of the object. Additionally, each series of UndoInfo Objects is delimited by an end-of-series indicator "Nil" at its end. This modification log construction results in a highly unbalanced tree structure.

As explained above, the present invention is preferably integratable into a computer program written in an object oriented language such that the "Object" stored by each collection of UndoInfo Group and corresponding UndoInfo Objects may consist of an object-type identifier indicating the class of object, and a list of its set, or set-able, parameters, which collectively describe an instantiated program object. As a result, the recorded information is very small and takes a much smaller space memory than conventional methods.

This approach is further simplified if the computer program into which the present undo function is being added is a program that supports a "Reflection" functionality similar to the "Reflection" function supported by the Java™ Reflection API. In essence, Java™ Reflection API permits introspection of a loaded class (and thereby an instantiated object) during runtime to basically interrogate it regarding its internal makeup and assigned parameter values. As a result, one can create an instance of a class whose name is not known until runtime, and the instantiated class can be plugged into the running program without having to recompile any code.

Web-site http://java.sun.com/products/jdk1.1/docs/guide/reflection/, on which Sun Microelectronics, the creators and curators of JAVA™, discuss JKD content, describes JAVA's Reflection capability as permitting code to discover information about the fields, methods and constructors of loaded classes by requesting that such information be reflected to the code, and to use the reflected fields, methods, and constructors to operate their underlying counterparts on objects. Sun Microelectronics further explains that the Java Reflection API is intended for use by program developers using tools such as debuggers, class browsers, object inspectors, and interpreters, and that the reflection mechanism should be avoided when other tools more natural to the language would suffice.

However, the present invention has found that the introspection capabilities provided by an object oriented program language, such as Java, facilitates the creation of the presently described new method for implemented an undo function. Furthermore, since this introspection capability is supported by any target program supporting the Java Reflection API, or similar function, the present method can be seamlessly integrated into such a target program without requiring much code modification to the target program. This is because the Java Reflection API functionality is a function of the program language and not the target program itself. As the target program runs, the present invention will be able to interrogate a modified object in regards to its internal parameters, internally supported functions, and modified data. Thus, the present invention can then determine which of the object's internally supported functions are needed to undo the current modification, as well as the required parameter values, and store only the needed information in a collection of UndoInfo Group and corresponding UndoInfo Objects. When responding to an undo request, the present invention simply invokes a function supported by the target object and passes the necessary parameter values/settings for restoring the target object to its state prior to its most current modification.

Alternatively, a collection of UndoInfo Group and corresponding UndoInfo Objects may include, or additionally include, the changed parameter values of a modified object. In this manner, in addition to being able to implement an undo function, the present invention may also implement a "redo" function of an object's most recent modification.

Returning to FIG. 2 to recapitulate, each UndoInfo object contains a changed attribute of an object. Each UndoInfo Group contains a group of UndoInfo objects. When an undo operation is invoked, the UndoInfo group which points to the "NIL" will be removed from the tree. Then each UndoInfo object will be examined to perform the undo operation for the target object.

When an undo operation is performed according to the UndoInfo object, the following procedure may be applied.

Step 1: If the ID in the UndoInfo object is "UNDO_OBJECT_LIST", then go to Step 5, otherwise go to Step 2.

Step 2: Get the target object. The undo operation will be performed on the target object.

Step 3: Prepare the function to be called in the target object. The function is identified by the function name string and the parameter object stored in the UndoInfo object. If the function can not be identified in the target object, the undo operation will be ignored.

Step 4: Call the function with the parameter object. Then return from the function.

Step 5: The object list of the document will be replaced by the parameter object in UndoInfo.

A sample Java code for implementing the preferred embodiment described above is as follows:

Listing 1: UndoInfo.java

```
package epal.renderbox;
public class UndoInfo
{
    // Restore the object list
    public static final int UNDO_OBJECT_LIST = 0;
    // Restore the object property
    public static final int UNDO_OBJECT_CHANGE = 1;
    private Object m_target;
    private int m_id;
    private String m_func;
    private Object m_param;
    public UndoInfo(Object target, int id, String func, Object param)
    {
        m_target = target;
        m_id = id;
        m_func = func;
        m_param = param;
    }
    public Object getTarget( )
    {
        return m_target;
    }
    public int getID( )
    {
        return m_id;
    }
    public String getFunc( )
```

```
        {
            return m_func;
        }
        public Object getParam( )
        {
            return m_param;
        }
        public String toString( )
        {
            return "UndoInfo:" +
                "[target=" + getTarget( ) +
                ",ID=" + getID( ) +
                ",func=" + getFunc( ) +
                ",param=" + getParam( ) +
                "]";
        }
}
```

Listing 2: UndoManager.java

```
/*
 * $Workfile: UndoManager.java $
 *
 * Copyright (c) 1995–2001 EPSON
    Palo Alto Laboratory. All Rights Reserved.
 * EPSON Research and Development.
    Inc. A Seiko EPSON Subsidiary. * All rights reserved.
 *
 */
package epal.renderbox;
import java.util.*;
import java.lang.reflect.*;
/**
 * UndoManager.
 *
 */
public class UndoManager {
        private Vector m_vUndoGroups = new Vector ( );
        private int m_iUndoSize = 30;
        private RenderBoxModel m_rbm;
        private Hashtable m_htUndo = new Hasbtable( );
public UndoManager (RenderBoxModel rbm)
{
        this(rbm, 30);
}
public UndoManager(RenderBoxModel rbm, int undoSize)
{
        if (undoSize >= 1)
        m_iUndoSize = undoSize;
        m_rbm = rbm;
}
public void startSaveUndo(Object target)
{
        UndoGroup ugrp = (UndoGroup) m_htUndo.get(target);
        if (ugrp == null) {
            ugrp = new UndoGroup(this);
            m_htUndo.put(target, ugrp);
        }
        ugrp.startSaveUndo ( );
}
public void saveUndo(Object target, String func, Object param)
{
        UndoGroup ugrp = (UndoGroup) m_htundo.get(target);
        if (ugrp != null)
            ugrp.saveUndo(target, func, param);
        }
        public void endSaveUndo(Object target)
        {
        UndoGroup ugrp = (UndoGroup) m_htUndo.get(target);
        if (ugrp != null) {
            ugrp.endSaveUndo ( );
            if (ugrp.isDiscardable( )) {
                m_htUndo.remove(target);
            }
        }
    }
}
public void putUndoInfo(Vector vInfo)
{
    if (m_vUndoGroups.size( ) == m_iUndoSize)
```

```
        m_vUndoGroups.removeElementAt(0);
        m_vUndoGroups.addElement (vInfo);
}
public void clearUndoInfo( )
{
        m_vUndoGroups.removeAllElements ( );
}
public Vector getundoInfo( )
{
        if (m_vUndoGroups.size( ) == 0)
            return null;
        Vector vInfo = (Vector)
        m_vUndoGroups.elementAt(m_vUndoGroups.size( ) – 1);
        m_vUndoGroups.removeElement (vInfo);
        return vInfo;
}
private Method getMethod( UndoInfo info, Class clsParam )
{
        if ( clsParam == null ) {
            return null;
        }
        Class[ ] clsParams = { clsParam };
        try {
        return info.getTarget( ).getClass( ).getMethod(info.getFunc( ),
        clsParams );
        }catch ( Exception e ) {
        return getMethod( info, clsParam.getSuperclass( ) );
        }
}
public void undo( )
{
        // Flush current undo log
        flushSaveUndo( );
        Vector vInfo = getUndoInfo( );
        if (vInfo == null)
        return;
        if (vInfosize( ) == 0)
        return;
        for (int i = vInfo.size( ) – 1; i >= 0; i––) {
            UndoInfo info = (UndoInfo) vInfo.elementAt(i);
            // Apply the undo info
            if (info.getID( ) == UndoInfoUNDO_OBJECT_CHANGE) {
            try {
                String func = info.getFunc( );
                Object param = info.getParam( );
                Object target = info.getTarget( );
                Class clsParam = param.getClass( );
                if (param instanceof Integer) {
                clsParam = Integer.TYPE;
                else if (info.getParam( ) instanceof Boolean) {
                }clsParam = Boolean.TYPE;
                }
                Method method = getMethod( info, clsParam );
                Object [ ] objParams = { param };
                method.invoke (target, obj Params);
            }catch (Exception e) {
            System.err.println
            ("Can not undo:" + "UNDO_OBJECT_CHANGE");
            System.err.println(info);
            }
        }else if (info.getID( ) == UndoInfo.UNDO_OBJECT_LIST) {
            m_rbm.removeAllROModels( );
            Vector vModels = (Vector) info.getParam( );
            for (int j = vModels.size( ) – 1; j >= 0; j––) {
                ROModel rm = (ROModel) vModels.elementAt(j);
                m_rbm.addROModel(rm);
            }
        }
    }
}
private void flushSaveUndo( )
{
        for (Enumeration e = m_htUndo.keys( ); e.hasMoreElements( );) {
            Object target = e.nextElement( );
            UndoGroup ugrp = (UndoGroup) m_htUndo.get (target);
            if (ugrp != null) {
            while (!ugrp.isDiscardable( )) {
                ugrp.endSaveUndo ( );
            }
```

-continued

```
        }
    }
    m__htUndo.clear( );
}
public int getUndoHistorySize( ) {
    return m__vUndoGroups.size( );
}
}
class UndoGroup
{
    /**
     * The current undo info group.
     */
    private Vector m__vUndoLevels = new Vector( );
    private UndoManager m__manager = null;
    public UndoGroup (UndoManager manager)
    {
        m__manager = manager;
    }
    private Vector getUndoCurrentLevel ( )
    {
        if (m__vUndoLevels.size( ) == 0)
        return null;
        return (Vector)
        m__vUndoLevels.elementAt(m__vUndoLevel.size( ) - 1);
    }
    private void cleanUpUndoLog( )
    {
        for (int i = 0; i < m__vUndoLevels.size( ); i++) {
        Vector v = (Vector) m__vUndoLevels.elementAt(i);
        if (v.size( ) != 0) {
        m__manager.putUndoInfo(v);
        m__vUndoLevels.setElementAt(new Vector( ), i);
        }
        }
    }
}
public boolean isDiscardable( )
{
    return (m__vUndoLevels.size( ) == 0);
}
/**
 * Start saving UNDO information as a group.
 */
public void startSaveUndo( )
{
    cleanUpUndoLog( );
    m__vUndoLevels.addElement (new Vector( ));
}
/**
 * Add an undo information object to the group.
 *
 * @param func
 * @param param
 */
public void saveUndo(Object target, String func, Object param)
{
    Vector vUndoInfo = getUndoCurrentLevel( );
    if (vUndoInfo != null) {
    // Search if there is already an undo info which has the same
    // target and function in the group.
    boolean bFound = false;
    for (int i = 0; i < vUndoInfo.size( ); i++) {
        UndoInfo ui = (UndoInfo) vUndoInfo.elementAt(i);
        if (ui.getTarget( ) == target && ui.getFunc( ).equals(func)) {
            bFound = true;
            break;
        }
    }
    // Log the undo info only when the func was not set before.
    If the func is
    // set, ignore this undo info.
    if (!bFound) {
    vUndoInfo.addElement(new UndoInfo(target,
    UndoInfo.UNDO__OBJECT__CHANGE, func,
    param));
    } else {
    }
    }
}
}
```

-continued

```
/**
 * Commit the undo info to the undo manager of the RenderBoxModel.
 */
public void endSaveUndo( )
{
    Vector vUndoInfo = getUndoCurrentLevel( );
    if (vUndoInfo != null) {
        if (vUndoInfo.size( ) > 0) {
        // Commit the group
        m__manager.putUndoInfo(vUndoInfo);
        }
        m__vUndoLevels.removeElement(vUndoInfo);
    }
}
}/*--------------------------*
```

The above code shows an implementation of the presently preferred embodiment in Java code for purely illustrative purposes. It is to be understood that the present invention may be implemented in any of many different program languages, and preferably implanted in an object oriented program language having a class introspective capability, such as described above.

Some of the advantages of the present invention are as follows:

Information recorded is very small.

Scalability. Currently, the parameter object is stored in memory. If one stores large objects, memory might be an issue. With proper implementation, one can store the large objects on a local disk or network.

Simplicity. Very easy to implement, and easily portable to other programs.

Flexibility. Although in current system, the UndoInfo group is not treated as an UndoInfo object, with proper implementation, one can make UndoInfo group an UndoInfo object so that the tree can be further extended.

Figure 3:
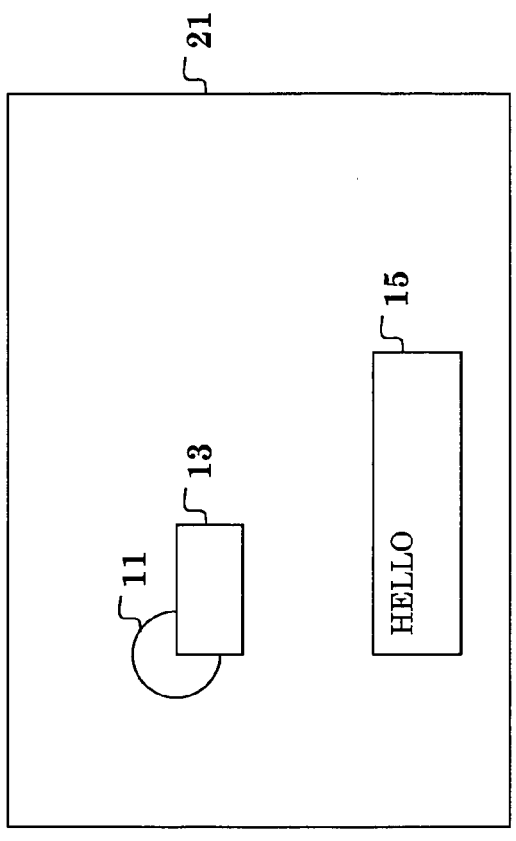
FIG. 3 shows program objects sequentially created for display on a computer screen.
Figure 4:
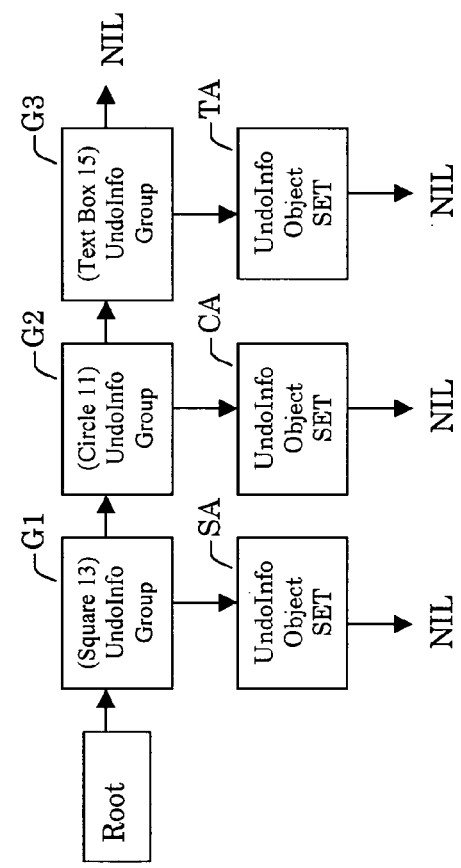
FIG. 4 is an unbalance tree representation of the modifications of FIG. 3 in accord with a second embodiment of the present invention.

Referring to FIGS. 3 and 4, a second embodiment of the present invention permits object-specific undo functions. Unlike prior art undo functions where only the most recently modified object may have its most current function undone, in the present second embodiment any selected object (in any order) may have its most recent modification undone. Thus, if multiple objects are modified in sequence, and then a user realizes that one of the intervening modifications should be undone, the user will not have to sequentially undo all of the most recent modifications to all objects until reaching the modified object that the user wishes to correct. Rather, the user may select a target object in any order, and submit an undo request for the highlighted, i.e. selected, object. In effect, the present second embodiment provide an "object undo", or object-specific, undo function.

In FIG. 3, an image similar to that of FIG. 1 is shown, but this time it is assumed that the log structure shown in FIG. 4 was generated as the images shown in screen 21 of FIG. 3 were sequentially created. For simplicity, the UndoInfo Objects corresponding to a group of same-object modifications are labeled as an UndoInfo Object Set. For example, G1_P1 and G1_P2 of FIG. 2, would be assumed to be represented by a single UndoInfo Object Set, such as SA for example, in FIG. 4.

In the present example, square 13 is drawn first such that the first UndoInfo Group G1 is correlated to Square 13, and its creation parameters are housed within UndoInfo Object Set SA. Circle 11 is created next, and second UndoInfo Group G2 is therefore correlated to Circle 11. The creation parameters, including its relative position and a z-order lower than Square 13 are housed in UndoInfo Object Set CA. Lastly, Text Box 15 is created, and UndoInfo Group G3 is likewise created and appended following G2. As in the previous case, the creation parameters of Text Box 15 are house in corresponding UndoInfo Object Set TA.

Figure 5:
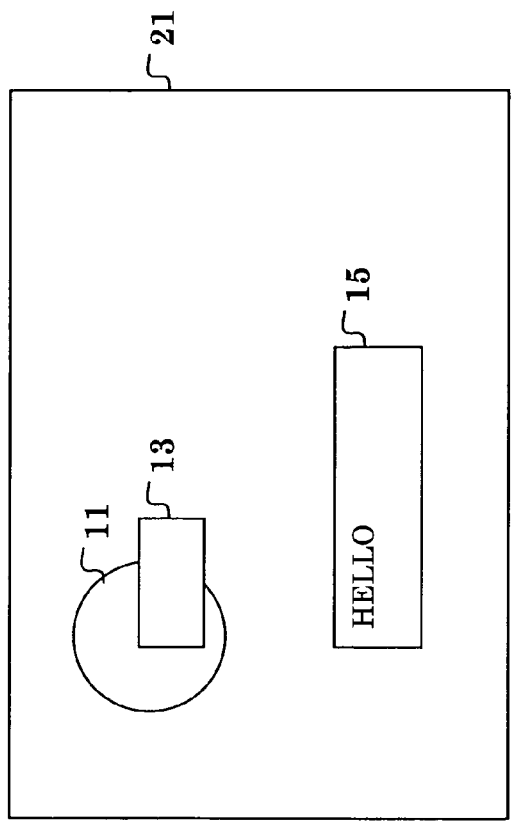
FIG. 5 shows a modification to an object of FIG. 3.
Figure 6:
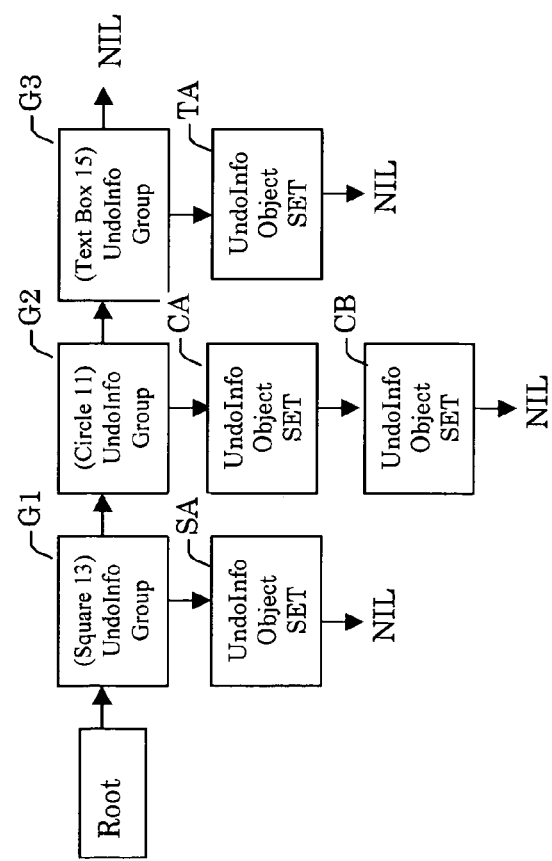
FIG. 6 is an unbalance tree incorporating the modification of FIG. 5 in accord with second embodiment of the present invention.

Referring now to FIGS. 5 and 6, the size of Circle 11 is shown to have been increased in FIG. 5. To add a record of this modification to the modification log of FIG. 6, the present second embodiment begins at the Root and sequentially progresses down the series of UndoInfo Groups G1–G3 toward its end, NIL, looking for the first occurrence of an UndoInfo Group correlated to Circle 11. In the present example, UndoInfo Group G2 correlates to Circle 11, and a second UndoInfo Object Set CB is created and appended following the previously last UndoInfo Object Set CA.

Thus, if a user selects Circle 11 and submits an "object undo", the present invention will respond by obtaining the unique name of the selected object and proceed from the Root toward the end NIL of UndoInfo Groups G1–G3 looking for the first UndoInfo Group correlated to Circle 11. Then the most recent UndoInfo Object Set, i.e. the one set next to NIL, is removed and its instructions for restoring the selected object are executed. In this manner, an "object undo", or object-specific undo, function may be implemented.

Figure 7:
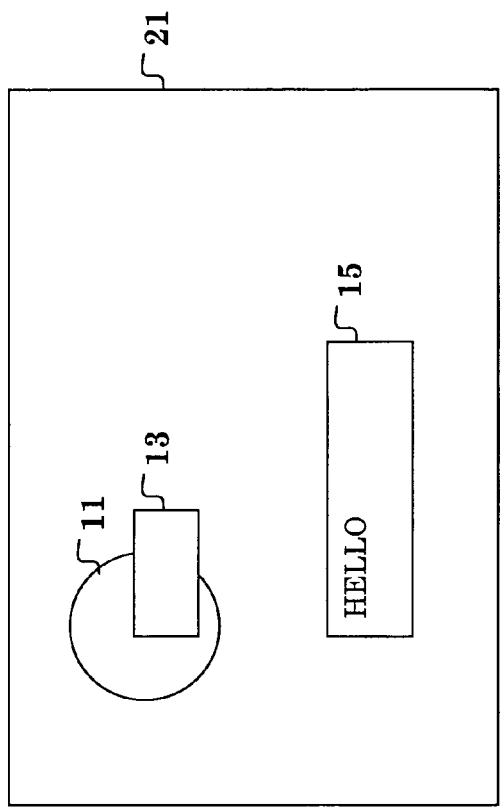
FIG. 7 shows the modification to an object of FIG. 3 in accord with a third embodiment of the present invention.
Figure 8:
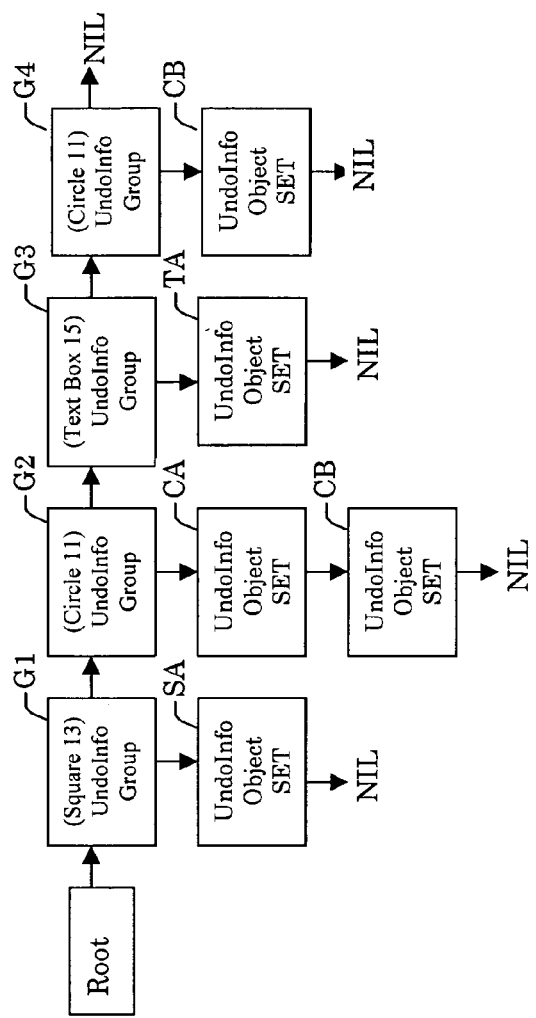
FIG. 8 shows an unbalance tree incorporating the modification of FIG. 7 in accord with the third embodiment of the present invention.

With reference to FIGS. 7 and 8, in a third embodiment of the present invention the undo function supports not only an "object undo", but also supports the more traditional "undo most recent change" operation wherein modifications are undone in sequence from the most recent to the earliest. Assuming a similar progression of events as illustrated in FIGS. 3–6, the size-increase modification of Circle 11 additionally results in creation of a new UndoInfo Group G4 that is also correlated to Circle 11, and is further appended to the end of the series of UndoInfo Groups G1–G3. The undo information in UndoInfo Object Set CB is also added to new UndoInfo Object Group G4. The combined "object undo" and "undo most recent change" operations are described below.

Figure 9:
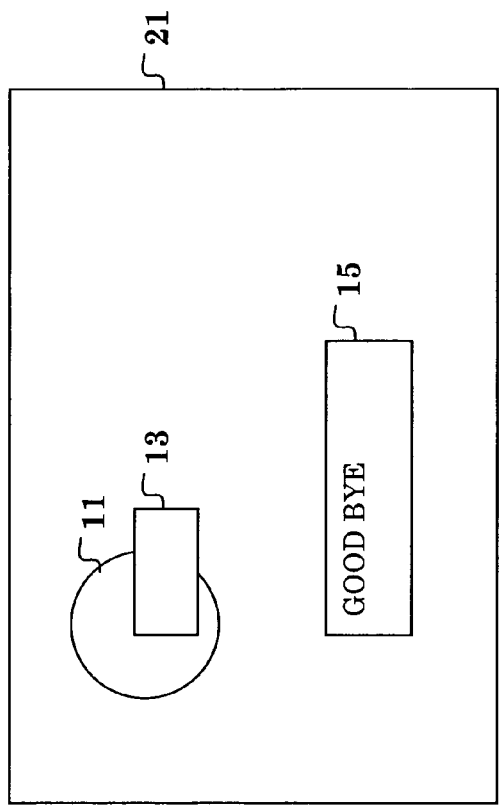
FIG. 9 shows the modification to an object of FIG. 7 in accord with the third embodiment of the present invention.
Figure 10:
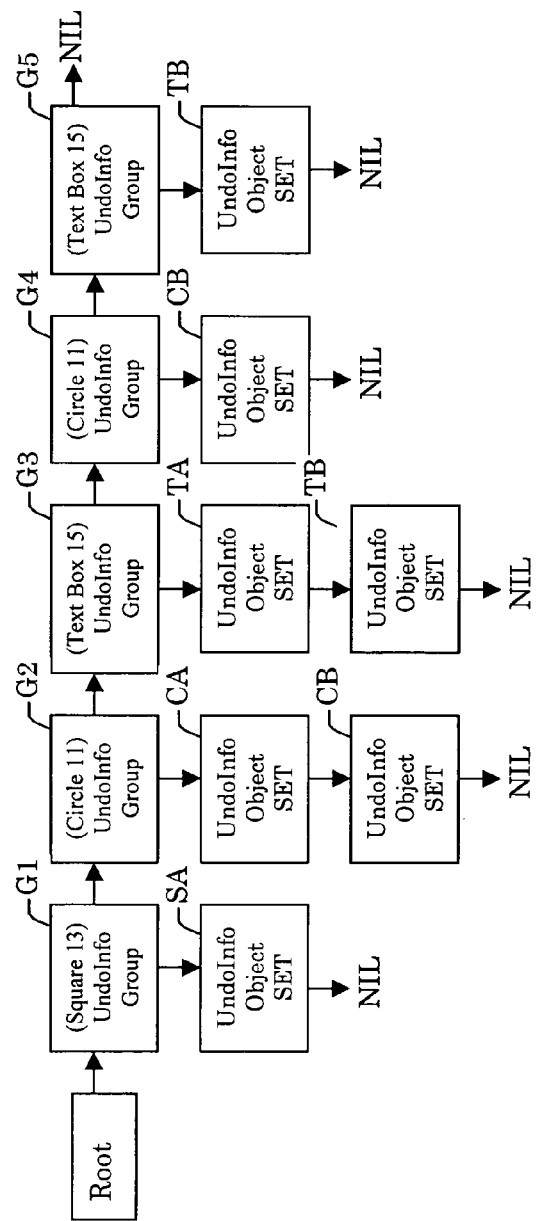
FIG. 10 shows an unbalance tree incorporating the modification of FIG. 9 in accord with the third embodiment of the present invention.

In FIG. 9, Text Box 15 is modified to have its displayed message changed from "HELLO" to "GOOD BYE". Following a sequence of events similar to those described in reference to FIGS. 5–7, the present invention responds to the change by obtaining the unique name identifier of the selected object, i.e. Text Box 15. The present invention then proceeds from the Root toward the end, i.e. NIL, of UndoInfo Groups G1–G4 of FIG. 8 looking for the first UndoInfo Group correlated to Text Box 15, i.e. G3 in this case. Upon finding G3, a new UndoInfo Object Set TB is created and appended following UndoInfo Object Set TA, as shown in FIG. 10. The invention then creates a new UndoInfo Group G5 correlated to Text Box 15 and appends it to the end of the series of UndoInfo Groups G1–G4. The undo information in UndoInfo Object Set TB is also added to new UndoInfo Object Group G5.

Figure 11:
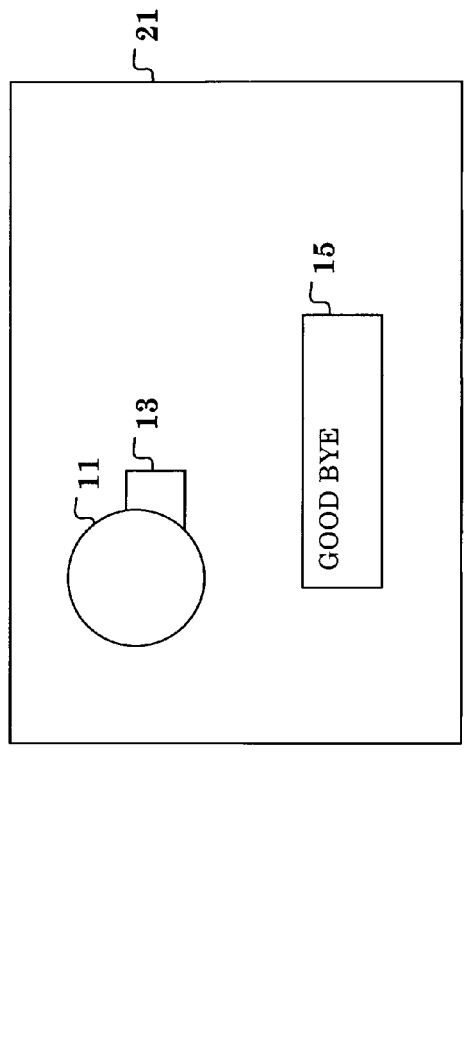
FIG. 11 shows an additional modification to an object of FIG. 9.
Figure 12:
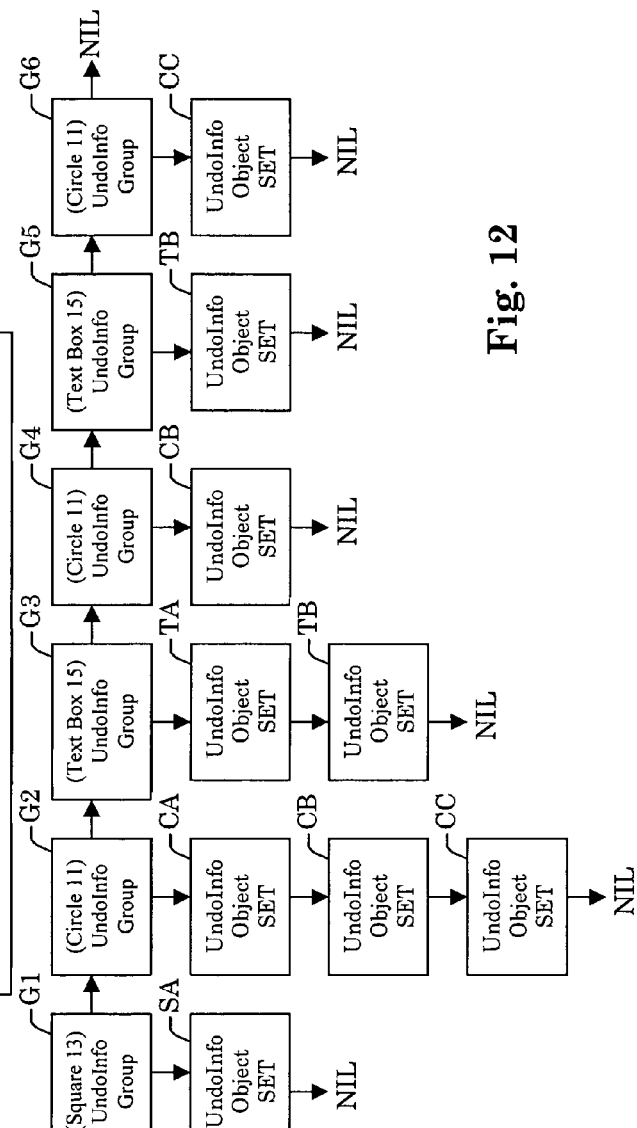
FIG. 12 shows an unbalance tree incorporating the modification of FIG. 11 in accord with the third embodiment of the present invention.

Lastly as shown in FIG. 11, Circle 11 is again modified to have its z-order changed to bring Circle 11 in front of Square 13. Like in the previous case, this results in the addition of a new UndoInfo Object Set CC appended to the first UndoInfo Group (G2) correlated to Circle 11 in series G1–G5, as is shown in FIG. 12. Also like in the previous case, a new UndoInfo Group G6 correlated to Circle 11 is created and appended to the end series G1–G5. The undo information in UndoInfo Object Set CC is also added to new UndoInfo Object Group G6.

Figure 13:
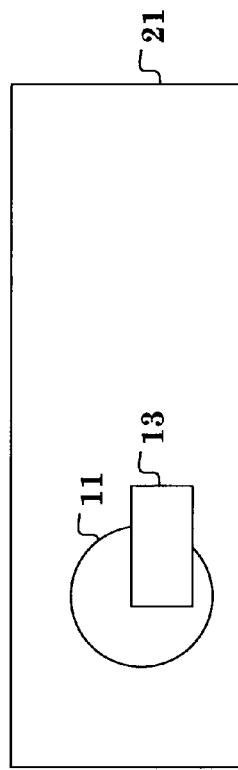
FIG. 13 shows an undo operation on an object of FIG. 11.
Figure 14:
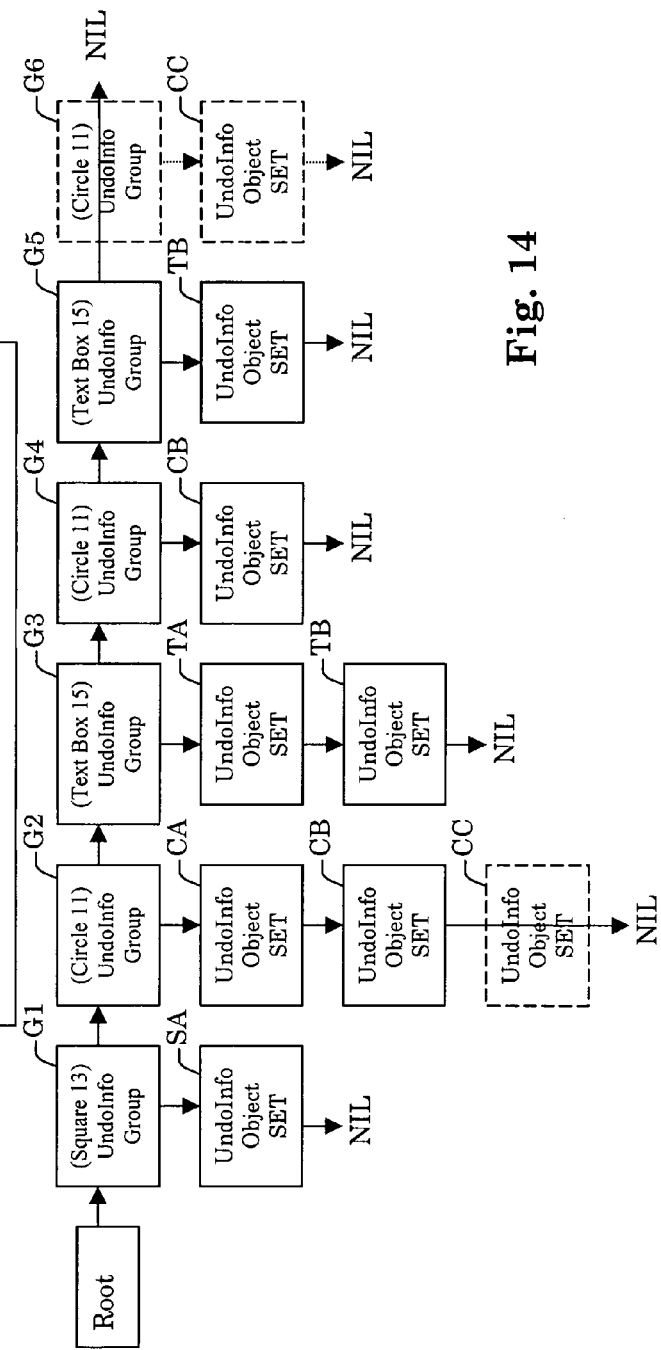
FIG. 14 shows the modification of the unbalance tree of FIG. 12 to incorporate the undo operation of FIG. 13.

In reference to FIGS. 13 and 14, a general "undo most recent change" operation is shown. Like in the first embodiment, the last UndoInfo Group G6 (and its corresponding UndoInfo Object Set CC) in series G1–G6 is located and removed from the series of UndoInfo Groups, as indicated by dotted boxes. An undo instruction is generated using the information in G6's Undo Info Object Set CC, and the instruction is executed to return the z-order of Circle 11 to its previous value. As shown in FIG. 13, this results in Square 13 once again being in front of Circle 11. Additionally, the present invention progresses down series G1–G5 starting from its origin, Root, looking for the first occurrence of an UndoInfo Group correlated to the same object that was correlated to G6. In the present case, the object is Circle 11, and the desired UndoInfo Group is G2. Upon finding G2, its last UndoInfo Object Set CC is removed form its series of UndoInfo Object Sets CA–CC, as is illustrated by a dotted box.

If another "undo most recent change" instruction were executed, then the next most recent modification would be undone. In the present case as indicated by G5, this next most recent modification refers to the message modification in Text Box 15.

Figure 15:
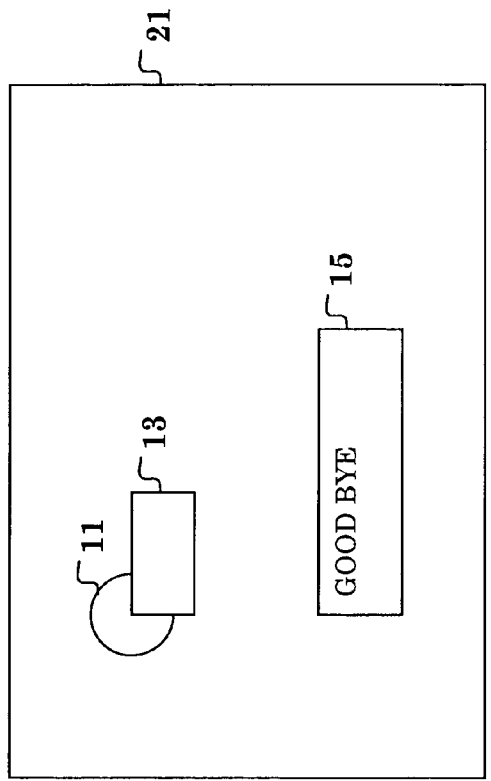
FIG. 15 shows an object-specific, undo operation on an object of FIG. 7.
Figure 16:
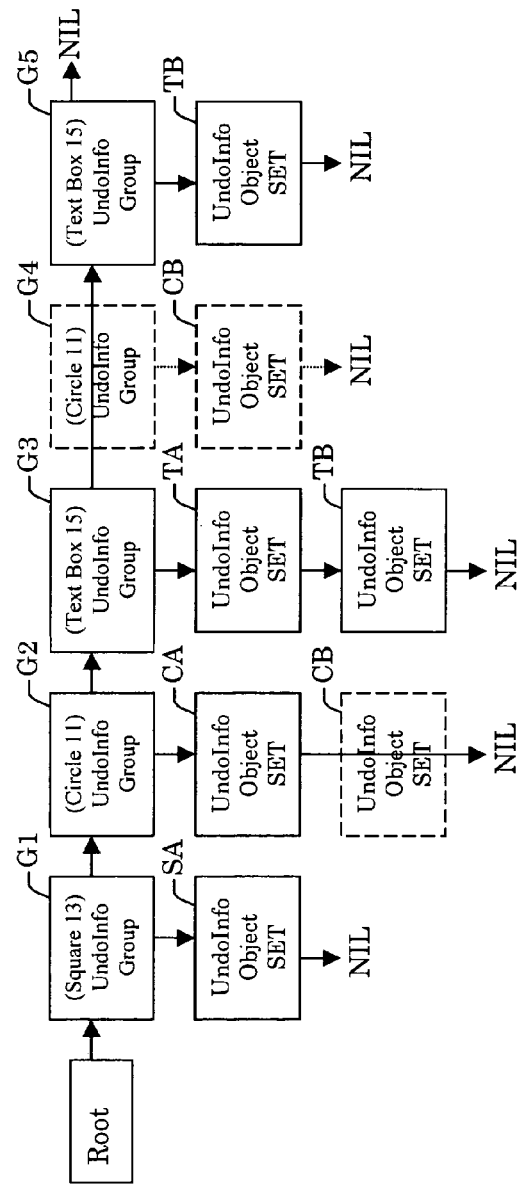
FIG. 16 shows the modification of the unbalance tree of FIG. 14 to incorporate the object-specific, undo operation of FIG. 15.

However, FIGS. 15 and 16 assume that the user instead selected Circle 11 and requested an "object undo" operation so as to undo the most recent change specifically applied to Circle 11, in particular. As in the previous example of FIGS. 5 and 6, the present invention begins by progressing down series G1–G5 from its origin, Root, toward its end, NIL. Upon finding the first occurrence of an UndoInfo Group correlated to Circle 11 (i.e. G2 in the present example), the latest Undo Info Object Set, CB, in the found UndoInfo Group G2 is removed from the found UndoInfo Group, as is indicated by a dotted box. An undo instruction is then generated using the information in G2's Undo Info Object Set CB, and the instruction is executed to restore size of Circle 11, as is shown in FIG. 15.

The invention then progresses up series G5–G1 starting from its end, NIL, toward its origin, Root, looking for the first occurrence of an UndoInfo Group correlated to Circle 11 (G4 in this case). If this progression were to have reached G2, then the invention would have assumed that no additional changes had been made on Circle 11 since its creation and no further operations would be necessary. However, if a second UndoInfo Group (such as G4) other than the first (G2) is found, then the second UndoInfo Group G4 is removed from the series G1–G5 (as shown by dotted boxes), and the series is reconstructed with the omission of G4. Thus, the new series would follow a sequence of "G1–G3+G5"

As it would understood, the undo operations of FIGS. 3–16, may be easily modified to support redo operations with simple modifications considered to be within the realm of one versed in the art, and are considered within the scope of the present invention.

What is claimed is:

1. A process for tracking program operations in a computing device, said process comprising:
  specifying a root identifier in memory space for initiation of a series of serially coupled object-group identifiers;
  responding to a program operation modifying a target program object by interrogating said target program object for characterizing data including an object-identifier uniquely identifying said target program object and at least one of an object-type identifier describing said target object, a field entry, a variable parameter value, and an executable operation supported by the object type specified by said object-type identifier;

creating a new object-group identifier associated with said target program object, coupling said new object-group identifier to said series of coupled object-group identifiers, and associating said characterizing data directly with said new object-group identifier and not to any other object-group identifier within said series of serially coupled-object group identifiers.

2. The process of claim 1, wherein said characterizing data is associated with said new object group identifier by having each characterizing datum within said characterizing data serially coupled and delimited with said new object group identifier at its origin and an end-of-data identifier at its end.

3. The process of claim 1, wherein said series of serially coupled object group identifiers is delimited by said root at its origin and an end-of-groups identifier at its end.

4. The process of claim 1, wherein said program operation modifying said target program object is an user-initiated program operation.

5. The process of claim 1, wherein said program operation modifying said target program object is one of a method operation and a function operation.

6. The process of claim 1, wherein said process includes monitoring execution of said program operations to detect said modification of said target program object.

7. The process of claim 1 being further effective for implementing an "undo" operation in said computing device, wherein said process includes:

responding to an "undo" request by retrieving the characterizing data associated with the last object-group identifier in said series of serially coupled object-group identifiers, and removing said last object-group identifier from said series of serially coupled object-group identifiers, wherein said last object-group identifier identifies the most recently modified program object as a target restore object;

using the retrieved characterizing data to construct an instruction set to be executed by said computing device for restoring said target restore object to its state prior to its most recent modification.

8. The process of claim 7, wherein said retrieved characterizing data includes said object-type identifier, and the step to construct an instruction set includes a selecting of executable operations supported by the object-type specified by said object-type identifier and a selecting of parameters to be passed to said executable operation for restoring said target restore object.

9. The process of claim 8, wherein if the executable operations supported by the object-type specified by said object-type identifier are insufficient for restoring said target restore object, then displaying a message indicating that the requested "undo" operation cannot be implemented.

10. The process of claim 7, wherein said target restore object is fully described by an integral list of data structures and data parameters, and wherein said retrieved characterizing data specifies said data structures and their corresponding data parameters prior to their most recent modification.

11. The process of claim 7 being further effective for implementing a "redo" operation in said computing device, wherein said process includes:

responding to an "redo" request by using said retrieved characterizing data to construct an instruction set that when executed by said computing device would negate the most recent "undo" operation and restore said target object to its state immediately preceding to the most recent "undo" operation.

12. The process of claim 11, wherein said retrieved characterizing data includes said object-type identifier, and the step to construct an instruction set includes a selecting of executable operations supported by the object-type specified by said object-type identifier and a selecting of parameters to be passed to said executable operation for negating the most recent "undo" operation.

13. A process for tracking program operations in a computing device, said process comprising:

providing a series of serially coupled object-group identifiers, each object-group identifier being correlated to a program object by an object-name uniquely identifying the correlated program object, each object-group identifier including a chain of characterizing data-groups, each progressive characterizing data-group in said chain having a set of modification data indicating modifications to its corresponding program object since the immediately previous characterizing data-group in said chain;

responding to a program operation modifying a target program object by interrogating said target program object for characterizing data including its object-name uniquely identifying said target program object and at least one of an object-type identifier describing said target object, a field entry, a variable parameter value, and an executable operation supported by the object type specified by said object-type identifier; wherein if said target program object is correlated to a target object-group identifier within said series of serially coupled object-group identifiers as determined by the target program object's object-name, then collecting said characterizing data into a new characterizing data-group and appending said a new characterizing data-group to the target object-group identifier's chain of characterizing data-groups, wherein said new characterizing data-group includes a corresponding set of modification data indicating any modifications to said target program-object.

14. The process of claim 13, wherein if said target program object is not correlated to any existing object-group identifier within said series of serially coupled object-group identifiers as determined by the target program object's object-name, then:

a. creating a new object-group identifier associated with said target program-object;

b. appending said new object-group identifier to said series of coupled object-group identifiers;

c. collecting said characterizing data into a new characterizing data-group;

d. associating said new characterizing data-group directly with said new object-group identifier and not to any other object-group identifier within said series of serially coupled-object group identifiers, wherein said new characterizing data-group becomes a first link in a new chain of characterizing data-groups extending from said new characterizing data-group.

15. The process of claim 13 being further effective for implementing an "undo" operation in said computing device, wherein said process includes:

responding to an "object undo" request for an identified, user-specified program-object by identifying a restore object-group identifier from among said series of serially coupled object-group identifiers in accordance with the user-specified program-object's unique object-name;

retrieving the last characterizing data-group in the chain of characterizing data-groups belonging to said restore object-group identifier, and removing said last characterizing data-group from said chain of characterizing data-groups;

using the retrieved characterizing data-group to construct an instruction set to be executed by said computing device for restoring said user-specified program-object to its state prior to its most recent modification.

16. The process of claim 15, wherein said retrieved characterizing data-group includes said object-type identifier, and wherein the step to construct an instruction set includes a selecting of executable operations supported by the object-type specified by said object-type identifier and a selecting of parameters to be passed to said executable operation for restoring said target restore object.

17. The process of claim 16, wherein if the executable operations supported by the object-type specified by said object-type identifier are insufficient for restoring said user-specified program-object, then displaying a message indicating that the requested "undo" operation cannot be implemented.

18. The process of claim 13, wherein the steps for responding to said program operation modifying said target program object further including:
  i. creating a new object-group identifier associated with said target program object;
  ii. appending said new object-group identifier to the end of said series of coupled object-group identifiers;
  iii. collecting said characterizing data into a new characterizing data-group;
  iv. associating said new characterizing data-group directly with said new object-group identifier;
  whereby at least two object-group identifiers within said series of serially coupled object-group identifiers are correlated to said target program object.

19. The process of claim 18 being further effective for implementing an "undo" operation in said computing device, wherein said process includes:
  responding to an "undo most recent change" request by retrieving said new characterizing data-group from said new object-group identifier, and removing said new object-group identifier from said series of coupled object-group identifiers, wherein said new object-group identifier identifies the most recently modified program object as a target restore object;
  using the retrieved new characterizing data to construct an instruction set to be executed by said computing device for restoring said target restore object to its state prior to its most recent modification; and
  progressing from beginning toward end of said series of coupled object-group identifiers in search of a second object-group identifier correlated to said target restore object as determined by its object-name, and
  upon finding said second object-group identifier, removing the last characterizing data-group in the chain of characterizing data-groups belonging to said second object-group identifier.

20. The process of claim 19, wherein said process further includes:
  responding to an "object undo" request for an identified, user-specified program-object by progressing from beginning toward end of said series of coupled object-group identifiers in search of a restore object-group identifier correlated to said user-specified program-object as determined by the unique object-name of said user-specified program-object;
  retrieving the last characterizing data-group in the chain of characterizing data-groups belonging to said restore object-group identifier, and removing said last characterizing data-group from said chain of characterizing data-groups;
  using the retrieved characterizing data-group to construct an instruction set to be executed by said computing device for restoring said user-specified program-object to its state prior to its most recent modification;
  progressing from end toward beginning of said series of coupled object-group identifiers in search of a second object-group identifier correlated to said user-specified program-object as determined by its object-name, and
  upon finding said second object-group identifier, removing said second object-group identifier from said series of coupled object-group identifiers, and reconstructing said series of coupled object-group identifiers maintaining the substantially the same order of coupled object-group except for the removal said second object-group identifier.

* * * * *